(12) United States Patent
Igarashi et al.

(10) Patent No.: US 12,455,216 B2
(45) Date of Patent: Oct. 28, 2025

(54) SAMPLING METHOD

(71) Applicant: Terumo Kabushiki Kaisha, Tokyo (JP)

(72) Inventors: Masatsugu Igarashi, Kanagawa (JP); Takemi Kobayashi, Kanagawa (JP)

(73) Assignee: Terumo Kabushiki Kaisha (JP)

( * ) Notice: Subject to any disclaimer, the term of this patent is extended or adjusted under 35 U.S.C. 154(b) by 318 days.

(21) Appl. No.: 18/205,209

(22) Filed: Jun. 2, 2023

(65) Prior Publication Data

US 2023/0304902 A1 Sep. 28, 2023

Related U.S. Application Data

(63) Continuation of application No. PCT/JP2022/003050, filed on Jan. 27, 2022.

(30) Foreign Application Priority Data

Feb. 2, 2021 (JP) ................................. 2021-014839

(51) Int. Cl.
*C12M 1/26* (2006.01)
*G01N 1/20* (2006.01)

(52) U.S. Cl.
CPC .................. *G01N 1/2035* (2013.01)

(58) Field of Classification Search
CPC ......... G01N 1/2035; G01N 2001/1445; G01N 2001/205; C12M 29/00; C12M 33/00; C12M 41/48; C12M 41/34; C12M 41/32; C12M 33/04; C12M 37/00; C12M 33/12; C12N 1/00; C12N 5/00; C12N 5/06; C12Q 1/24; C12Q 1/00
USPC ............ 435/4–40, 52; 422/68.1, 81, 82; 73/863.02, 863.83, 1.02, 1.03, 61.43, 73/61.59, 64.56, 863.01, 863.31, 864.22, 73/864.34, 864.81
See application file for complete search history.

(56) References Cited

U.S. PATENT DOCUMENTS

| | | |
|---|---|---|
| 9,442,047 B2 | 9/2016 | Biksacky |
| 2010/0047122 A1 | 2/2010 | Barringer, Jr. |
| 2014/0033834 A1 | 2/2014 | Biksacky |
| 2014/0087413 A1 | 3/2014 | Newbold et al. |

(Continued)

FOREIGN PATENT DOCUMENTS

| | | |
|---|---|---|
| CN | 104845879 A | 8/2015 |
| JP | H0720013 A | 1/1995 |

OTHER PUBLICATIONS

Written Opinion of the International Searching Authority issued in the corresponding PCT Application No. PCT/JP2022/003050; mailed on Apr. 19, 2022 (total 6 pages).

(Continued)

*Primary Examiner* — Robert R Raevis
(74) *Attorney, Agent, or Firm* — Harness, Dickey & Pierce, P.L.C.

(57) ABSTRACT

A sampling method includes a sampling step and a cleaning step. The sampling step includes a first sample introduction step of introducing a first sample from a first cell culturing device to a more downstream side than a first connection portion in a sampling flow path, a first returning step of causing the first sample in the sampling flow path to flow into an introduction path from the first connection portion after the first sample introduction step, and a first flowing step of bringing the first sample into contact with a second sensor after the first returning step.

20 Claims, 12 Drawing Sheets

(56) References Cited

U.S. PATENT DOCUMENTS

2016/0025601 A1   1/2016   Newbold

OTHER PUBLICATIONS

International Search Report dated Apr. 19, 2022, issued in corresponding PCT Application No. PCT/JP2022/003050 with English translation (5 pages).
Supplementary European Search Report issued in the corresponding EP Application No. 22749600.7; mailed on Jun. 14, 2024 (total 17 pages).
Written Opinion issued in the corresponding EP Application No. 22749600.7; mailed on Jun. 14, 2024 (total 4 pages).

SAMPLING METHOD

CROSS-REFERENCE TO RELATED APPLICATIONS

The present application is a continuation application of the International Patent Application No. PCT/JP2022/003050 filed on Jan. 27, 2022, which designated the U.S. and claims the benefit of priority from Japanese Patent Application No. JP2021-014839 filed on Feb. 2, 2021. The entire disclosures of the above-identified applications are incorporated herein by reference.

FIELD

The present disclosure relates to a sampling method.

BACKGROUND

A sampling system may include a biosensor that is provided in a sampling flow path and configured to be in contact with a sample in the sampling flow path, and an introduction path for introducing a cleaning solution to the sampling flow path upstream of the biosensor. A method of using the sampling system may include a sampling step and a cleaning step. The sampling step may include causing the sample to flow through the sampling flow path and bringing the sample into contact with the biosensor The cleaning step may include introducing the cleaning solution from the introduction path into the sampling flow path and removing the sample adhering to the biosensor to prevent deterioration of a catalyst in the biosensor.

When the cleaning step is completed, the cleaning solution remains in the introduction path downstream side of a connection portion that connects the sampling flow path and the introduction flow path. Thereafter, when the sampling step is performed, the sample washes away cleaning solution that remains in the sampling flow path, while the cleaning solution in the introduction path remains. In such instances, there is a possibility that, during the sampling step, the cleaning solution in the introduction flow path may be mixed into the sample in the connection portion.

An object thereof of the present disclosure is to provide a sampling method that is capable of efficiently removing a sample adhering to a biosensor and preventing a cleaning solution from being mixed into the sample flowing through a sampling flow path.

SUMMARY

In various aspects, the present disclosure provides a sampling method that uses a sampling system. The sampling system may have a sampling flow path configured to collect a sample of a liquid in a cell culturing device. The sampling system may include a biosensor that is disposed in the sampling flow path and configured to be in contact with the sample. The sampling system may also include an introduction path configured to introduce a cleaning solution to the sampling flow path upstream of the biosensor. The sampling method may include a sampling step and a cleaning step. The sampling step may include causing the sample to flow through the sampling flow path from the cell culturing device and measuring a concentration of a predetermined component in the sample using the biosensor. The cleaning step may include, after the sampling step, causing the cleaning solution to flow from the introduction path into the biosensor through the sampling flow path. The sampling step may be performed twice or more. The sampling step at the second time and/or subsequent times may be performed after the cleaning step. The sampling step may also include a sample introduction step of introducing the sample from the cell culturing device downstream of a connection portion connecting the sampling flow path and in the introduction path, a returning step where the sample in the sampling flow path is caused to flow into the introduction path from the connection portion, for example, after the sample introduction step, and/or a flowing step where the sample is caused to flow through the sampling flow path from the cell culturing device bringing the sample into contact with the biosensor, for example, after the returning step.

Since the cleaning step is performed after the sampling step, the sample adhering to the biosensor in the sampling step can be removed by the cleaning solution in the cleaning step. In the sample introduction step, the sample may be introduced from the cell culturing device to the sampling flow path downstream of the connection portion. The sample may then be caused to flow into the introduction path in the returning step. In this manner, a vicinity of the sampling flow path near the connection portion can be filled with the sample and the cleaning solution can be removed from the vicinity of the connection portion. Therefore, in the flowing step, when the sample is caused to flow through the sampling flow path from the cell culturing device and is brought into contact with the biosensor, the cleaning solution in the introduction path may be prevented from mixing with the sample flowing through the sampling flow path.

DETAILED DESCRIPTION

Hereinafter, an example embodiment of a sampling method according to the present disclosure will be described with reference to the accompanying drawings.

Figure 1:
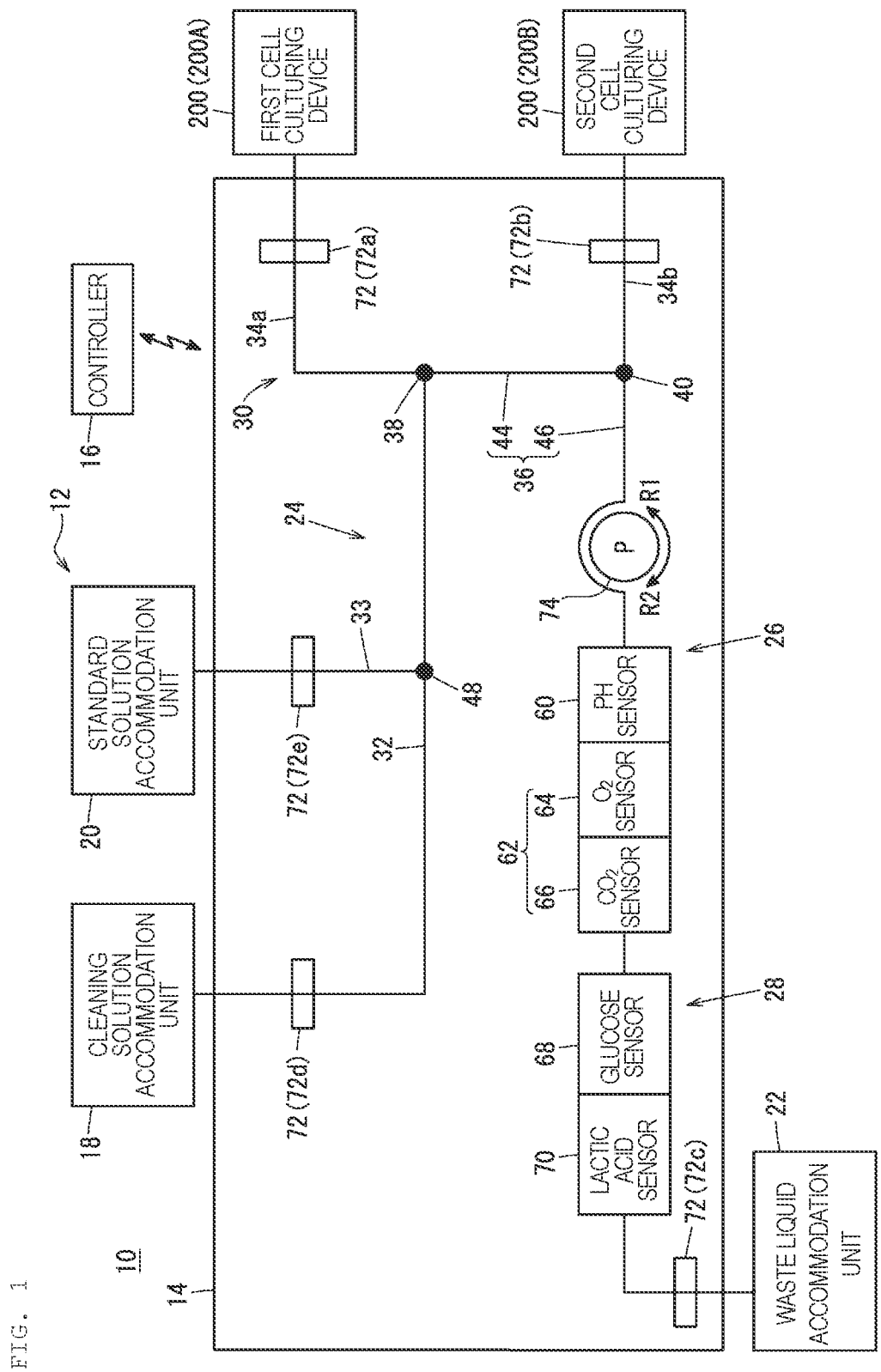
FIG. 1 is a schematic illustrating a sampling system, for example to be used in a sampling method, according to an example embodiment of the present disclosure.

As shown in FIG. 1, a sampling system 10 is configured to collect samples of liquids from a plurality of cell culturing devices 200 and to measure a concentration of predetermined components in the samples. The sampling system 10 includes a sampling kit 12, a circuit control device 14 on which the sampling kit 12 is detachably provided, and a controller 16. The sampling kit 12 is a disposable product, and the circuit control device 14 is a reusable product.

Figure 2:
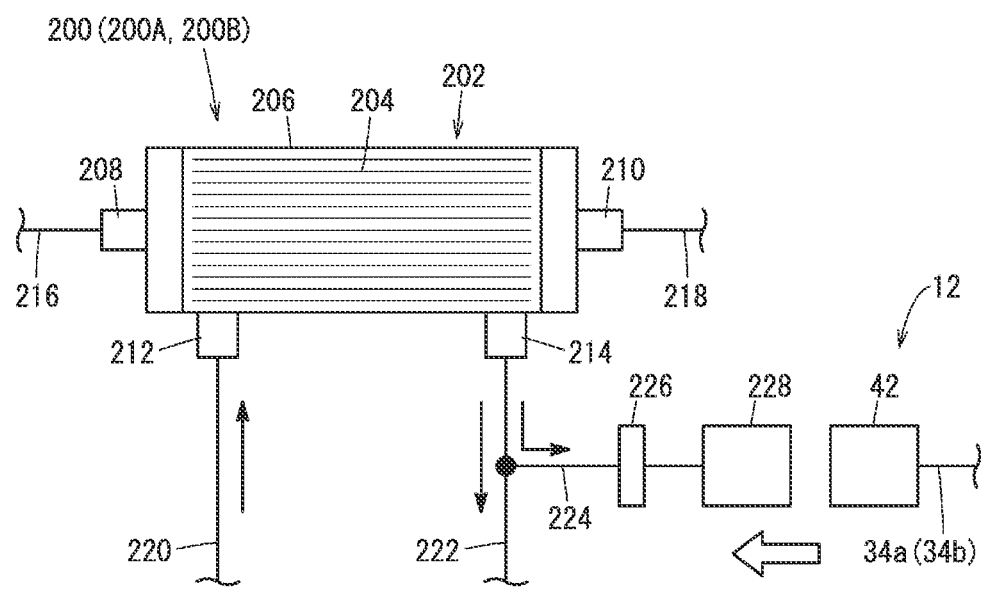
FIG. 2 is a schematic illustrating a main part of an example cell culturing device according to an example embodiment of the present disclosure.

In at least one example embodiment, the plurality of cell culturing devices 200 may include a first cell culturing device 200A and a second cell culturing device 200B which are connected to the sampling kit 12. As illustrated in FIG. 2, the cell culturing device 200 includes a bioreactor 202 for culturing cells. The cells to be cultured may be separated from a biological tissue. The cells may include, for example, T cells and/or stem cells (e.g., ES cells, iPS cells, mesenchymal stem cells, and the like).

The bioreactor 202 may be configured as a so-called hollow fiber type bioreactor. The bioreactor 202 includes a number of (for example, a plurality of) hollow fibers 204 and also a cylindrical housing 206 that accommodates the hollow fibers 204. A plurality of pores (not shown) may be formed in a wall portion constituting each hollow fiber 204. The pores allow for communication between an intracapillary (IC) region, which is an inner cavity of the hollow fiber 204, and an extracapillary (EC), which is a region located outside the hollow fiber 204. A diameter of each pore may be set to such a size that allows small molecules (for example, water, ions, oxygen, or lactic acid) to pass therethrough while blocking passage of larger molecules, like macromolecules (e.g., cells), therethrough.

The housing 206 may be provided with an IC inlet port 208, an IC outlet port 210, an EC inlet port 212, and an EC outlet port 214. The IC inlet port 208 may be provided at one end of the housing 206. The IC inlet port 208 is configured to introduce, into the IC region of the bioreactor 202, a liquid (for example, a solution containing cells, a culture medium, or the like) guided from an IC inlet flow path 216. The IC outlet port 210 may be provided at the other end of the housing 206. The IC outlet port 210 causes the liquid having flowed through the IC region of the bioreactor 202 to be introduced to an IC outlet flow path 218.

The EC inlet port 212 and the EC outlet port 214 may be provided on an outer peripheral surface of the housing 206. The EC inlet port 212 is configured to introduce a culture medium introduced from an EC inlet flow path 220 into the EC region of the bioreactor 202. The EC outlet port 214 introduces the culture medium having flowed through the EC region of the bioreactor 202 to an EC outlet flow path 222. As the culture medium, a suitable culture medium may be selected according to biological cells. In at least one example embodiment, a culture medium prepared, for example, by adding various amino acids, vitamins, serum, and the like to a balanced salt solution (BSS) as a basic solution may be used.

The EC outlet flow path 222 may be connected to a connection line 224 for guiding the culture medium having flowed through the EC region to the sampling kit 12. The connection line 224 may be provided with a sterile filter 226 and a sampling connector 228. The sterile filter 226 sterilely holds a portion of the cell culturing device 200 closer to the EC outlet flow path 222 than the sterile filter 226. An introduction connector 42 of the sampling kit 12 may be detachably connected to the sampling connector 228.

In at least one example embodiment, the sampling system 10 may collect, as the sample, the culture medium having flowed through the EC region of the cell culturing device 200. However, the sample to be collected by the sampling system 10 is not limited to the culture medium having flowed through the EC region, and may be a culture medium, another liquid, or the like having flowed through the IC region.

In FIG. 1, the sampling kit 12 includes a cleaning solution accommodation unit 18, a standard solution accommodation unit 20, a waste liquid accommodation unit 22, a connection circuit 24, a first sensor 26, and a second sensor 28.

For example, the cleaning solution accommodation unit 18, the standard solution accommodation unit 20, and the waste liquid accommodation unit 22 may be formed in a bag-like shape by using a soft resin material having flexibility, such as polyvinyl chloride or a polyolefin. However, the cleaning solution accommodation unit 18, the standard solution accommodation unit 20, and the waste liquid accommodation unit 22 can be appropriately changed as long as the liquid can be accommodated.

A cleaning solution is accommodated in the cleaning solution accommodation unit 18. As the cleaning solution, a buffer solution or a physiological saline solution is used. In at least one example embodiments, the buffer solution may include phosphate buffered saline (PBS) and/or tris-buffered saline (TBS). However, the cleaning solution is not limited to these examples.

A standard solution may be accommodated in the standard solution accommodation unit 20. The standard solution is a liquid for calibrating the first sensor 26 and the second sensor 28. Specifically, the standard solution may be a liquid in which a pH value, an $O_2$ value (oxygen concentration), a $CO_2$ value (carbon dioxide concentration), a glucose value (glucose concentration), and/or a lactic acid value (lactic acid concentration) is set to a specified value.

The waste liquid accommodation unit 22 may accommodate a waste liquid (including, for example, a portion of the sample, the cleaning solution, and/or the standard solution) having flowed through the connection circuit 24. The waste liquid accommodation unit 22 may be an empty bag in which no liquid is accommodated in a state before the sampling kit 12 is used.

The connection circuit 24 may include a sampling flow path 30 for collecting the sample in the cell culturing device 200, an introduction path 32 for guiding the cleaning solution to the sampling flow path 30, and a standard solution introduction path 33 for guiding the standard solution to the introduction path 32. The sampling flow path 30 may include a first sample introduction path 34a, a second sample introduction path 34b, and a sample flow path 36.

The first sample introduction path 34a may be configured to guide a sample (culture medium) in the first cell culturing device 200A to the sample flow path 36. One end of the first sample introduction path 34a may be provided with the introduction connector 42 to be mounted on the sampling connector 228 of the first cell culturing device 200A (see FIG. 2). The other end of the first sample introduction path 34a may be connected to one end of the sample flow path 36. Hereinafter, a connection portion between the first sample introduction path 34a and the sample flow path 36 is referred to as a first connection portion 38.

The second sample introduction path 34b may be configured to guide a sample (culture medium) in the second cell culturing device 200B to the sample flow path 36. One end of the second sample introduction path 34b may be provided with the introduction connector 42 to be mounted on the sampling connector 228 of the second cell culturing device 200B (see FIG. 2). The other end of the second sample introduction path 34b may be connected to an intermediate portion of the sample flow path 36. Hereinafter, a connection portion between the second sample introduction path 34b and the sample flow path 36 is referred to as a second connection portion 40.

The sample flow path 36 may include an intermediate flow path 44 that connects the first connection portion 38 and the second connection portion 40 to each other, and also a sensor flow path 46 that connects the second connection portion 40 and the waste liquid accommodation unit 22 to each other.

One end of the introduction path 32 may be connected to the cleaning solution accommodation unit 18. The other end of the introduction path 32 may be connected to the first connection portion 38. One end of the standard solution introduction path 33 may be connected to the standard solution accommodation unit 20. The other end of the standard solution introduction path 33 may be connected to an intermediate portion of the introduction path 32. Hereinafter, a connection portion between the introduction path 32 and the standard solution introduction path 33 is referred to as a third connection portion 48.

The first sensor 26 and the second sensor 28 may be provided in the sensor flow path 46 to be in contact with the sample. The first sensor 26 may be an integrally molded product and may include a pH sensor 60 and/or a gas concentration sensor 62. The pH sensor 60 measures a pH in the sample. The gas concentration sensor 62 measures a gas concentration in the sample. Specifically, the gas concentration sensor 62 may include an $O_2$ sensor 64 that is configured to measure an $O_2$ concentration in the sample and/or a $CO_2$ sensor 66 that is configured to measure a $CO_2$ concentration in the sample.

The second sensor 28 may include, for example, a biosensor, such as an enzyme sensor. The second sensor 28 may be provided downstream of the first sensor 26 in the sensor flow path 46. The second sensor 28 may be an integrally molded product, and includes a glucose sensor 68 that measures a glucose concentration in the sample and/or a lactic acid sensor 70 that measures a lactic acid concentration in the sample. The second sensor 28 is not limited to the enzyme sensor and may include a non-enzyme glucose sensor. A measurement item of the second sensor 28 is not limited to the glucose and/or the lactic acid and may include glutamic acid or the like.

The circuit control device 14 includes a plurality of clamps 72 and a pump 74. In the present embodiment, the circuit control device 14 includes, as the plurality of clamps 72, a first clamp 72a (first on-off unit), a second clamp 72b, a third clamp 72c, a fourth clamp 72d (second on-off unit), and/or a fifth clamp 72e.

The first clamp 72a may be disposed to face the first sample introduction path 34a in a state in which the sampling kit 12 is mounted on the circuit control device 14 (hereinafter referred to as a "set state") and may be configured to turn on or off an internal flow path in the first sample introduction path 34a. The second clamp 72b may be disposed to face the second sample introduction path 34b in the set state and may be configured to turn on or off an internal flow path in the second sample introduction path 34b. The third clamp 72c may be disposed to face a portion between the second sensor 28 in the sensor flow path 46 and the waste liquid accommodation unit 22 in the set state and may be configured to turn on or off an internal flow path in the portion in the sensor flow path 46. The fourth clamp 72d may be disposed to face a portion of the introduction path 32 on a more upstream side than the third connection portion 48 in the set state and may be configured to turn on or off an internal flow path in the portion of the introduction path 32. The fifth clamp 72e may be disposed to face the standard solution introduction path 33 in the set state and may be configured to turn on or off an internal flow path in the standard solution introduction path 33.

The pump 74 applies a flow force to an internal liquid by rotating in a manner of squeezing a wall portion constituting a flow path (tube) of the connection circuit 24. The pump 74 may be disposed to be in contact with a portion between the second connection portion 40 and the first sensor 26 in the sensor flow path 46 in the set state. The pump 74 performs a first rotation operation (rotation operation in a direction of an arrow R1) such that the flow force in a direction toward the first sensor 26 (waste liquid accommodation unit 22) is applied to a liquid flowing through the sensor flow path 46. In addition, the pump 74 performs a second rotation operation (rotation operation in a direction of an arrow R2) such that the flow force in a direction toward the second connection portion 40 is applied to the liquid flowing through the sensor flow path 46.

The controller 16 (control unit) may include a computer including a processor, a memory, and an input and output interface (not shown). The controller 16 performs overall control for the entire system by causing the processor to execute a program stored in the memory. The controller 16 is connected to the circuit control device 14 by communication means such as wire, radio, a network or a combination thereof. Specifically, the controller 16 controls operations of the plurality of clamps 72 and the pump 74.

Next, the sampling method using the sampling system 10 will be described.

Figure 3:
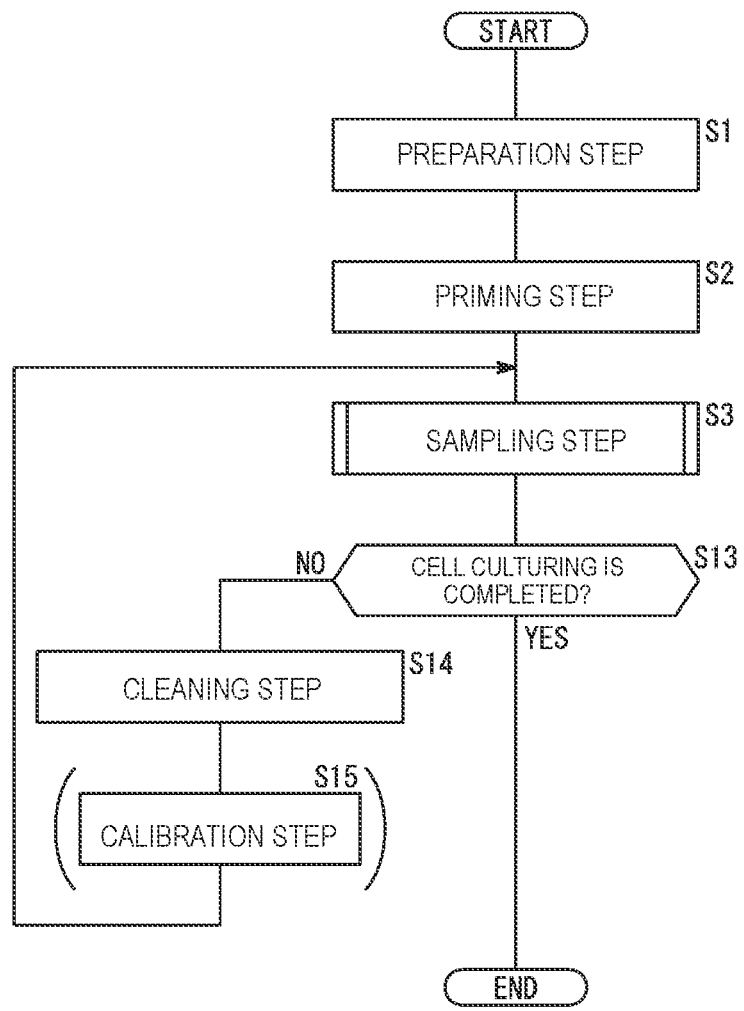
FIG. 3 is a flowchart illustrating the sampling method using the sampling system illustrated in FIG. 1.

As shown in FIG. 3, the sampling method may include a preparation step, a priming step, a sampling step, a cleaning step, and/or a calibration step.

First, in the preparation step (step S1), as shown in FIGS. 1 and 2, the sampling kit 12 may be mounted (e.g., set) to the circuit control device 14, the introduction connector 42 in the first sample introduction path 34a may be connected to the sampling connector 228 of the first cell culturing device 200A, and the introduction connector 42 in the second sample introduction path 34b may be connected to the sampling connector 228 of the second cell culturing device 200B.

Figure 5:
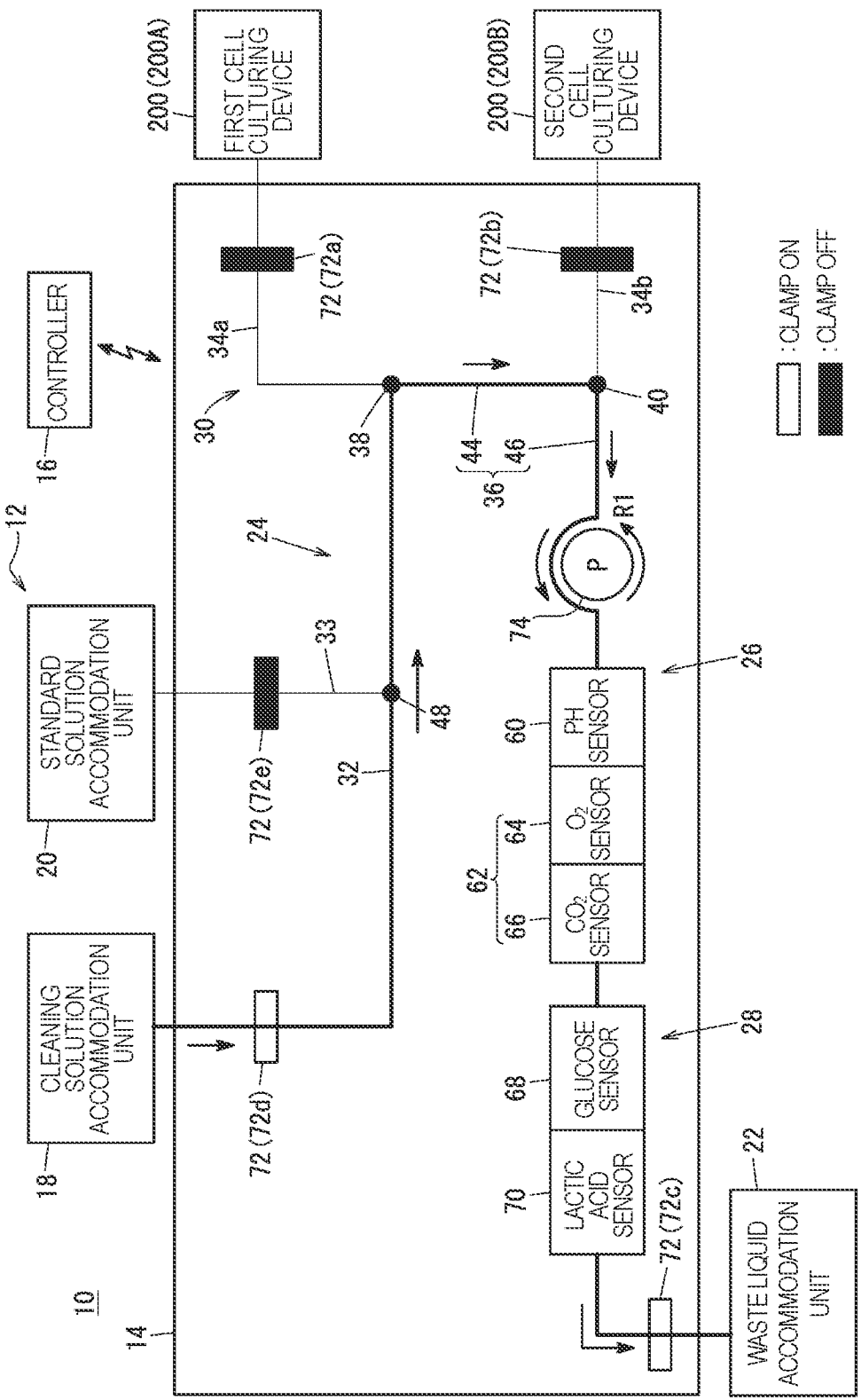
FIG. 5 is a schematic illustrating a first operation of the sampling method illustrated in FIGS. 3 and 4A-4C.

Subsequently, in the priming step (step S2 in FIG. 3), as shown in FIG. 5, the controller 16 may cause the pump 74 to perform the first rotation operation in a state in which the third clamp 72c and the fourth clamp 72d are turned on, and the first clamp 72a, the second clamp 72b, and the fifth clamp 72e are turned off. Accordingly, the cleaning solution in the cleaning solution accommodation unit 18 may be guided from the introduction path 32 to the waste liquid accommodation unit 22 through the first connection portion 38, the intermediate flow path 44, the second connection portion 40, and the sensor flow path 46 by an action of the pump 74.

Thereafter, the sampling step (step S3 in FIG. 3) may be performed. Specifically, the controller 16 may be configured to select a sample to be collected (step S4 in FIG. 4A). That is, the controller 16 selects which of the sample (first sample) in the first cell culturing device 200A and the sample (second sample) in the second cell culturing device 200B is to be collected based on a cell culturing state in the cell culturing device 200.

When the controller 16 selects to collect the first sample, the first sampling step may be performed (step S5 in FIG.

4A). As shown in FIG. 4B, the first sampling step may include a first sample introduction step, a first returning step, and/or a first flowing step.

Figure 6:
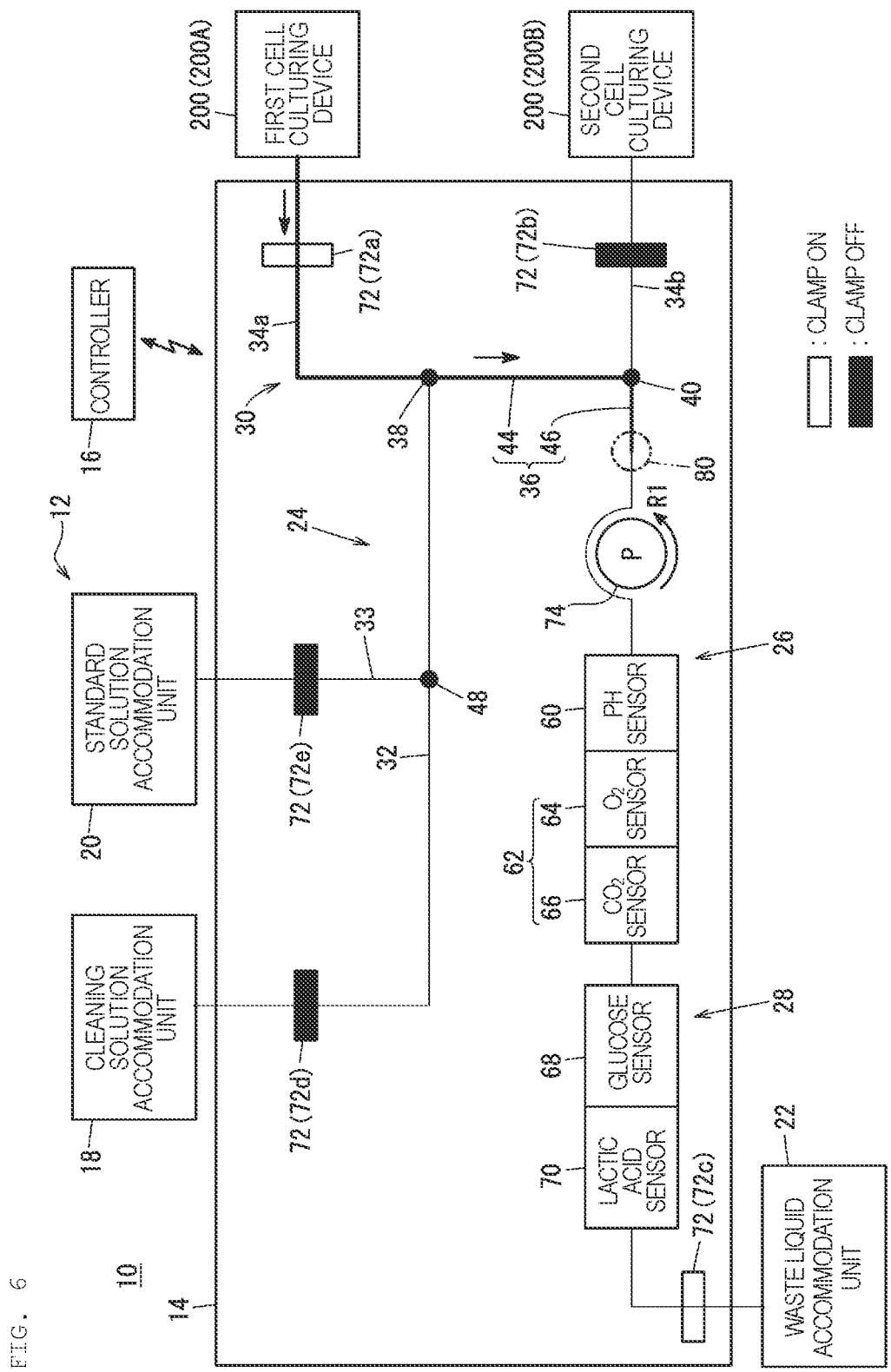
FIG. 6 is a schematic illustrating a second operation of the sampling method illustrated in FIGS. 3 and 4A-4C.

In the first sample introduction step (step S6), as shown in FIG. 6, the controller 16 may cause the pump 74 to perform the first rotation operation in a state in which the first clamp 72a and the third clamp 72c are turned on, and the second clamp 72b, the fourth clamp 72d, and the fifth clamp 72e are turned off. Accordingly, the first sample in the first cell culturing device 200A may be guided from the first sample introduction path 34a to the intermediate flow path 44 (sample flow path 36) through the first connection portion 38 by the action of the pump 74.

Specifically, the controller 16 may stop the first rotation operation, for example, when the first sample reaches a position in front of the first sensor 26 in the sensor flow path 46 (for example, reaches a position closer to the first sensor 26 than a center of a section between the second connection portion 40 and the first sensor 26 in the sensor flow path 46). In other words, the controller 16 may stop the first rotation operation of the pump 74 when a first time has elapsed since the pump 74 is caused to perform the first rotation operation. Here, the first time may be an elapsed time from a time when the pump 74 is caused to perform the first rotation operation until a time when the first sample reaches the position in front of the first sensor 26 in the sensor flow path 46. However, a sample detection sensor 80 (see FIG. 6) configured to detect the sample flowing through a portion between the second connection portion 40 and the first sensor 26 in the sensor flow path 46 may be provided in the circuit control device 14, and the controller 16 may stop the first rotation operation of the pump 74 when the sample detection sensor 80 has detected the sample.

In the first sample introduction step, a timing at which the first rotation operation of the pump 74 may be stopped can be appropriately changed. That is, the timing at which the first rotation operation of the pump 74 is stopped may be a timing at which the first sample has reached the intermediate flow path 44, a timing at which the first sample has reached a section between the first sensor 26 and the second sensor 28 in the sensor flow path 46, a timing at which the first sample has reached a section between the second sensor 28 in the sensor flow path 46 and the waste liquid accommodation unit 22, or a timing after the first sample is accommodated in the waste liquid accommodation unit 22.

Figure 7:
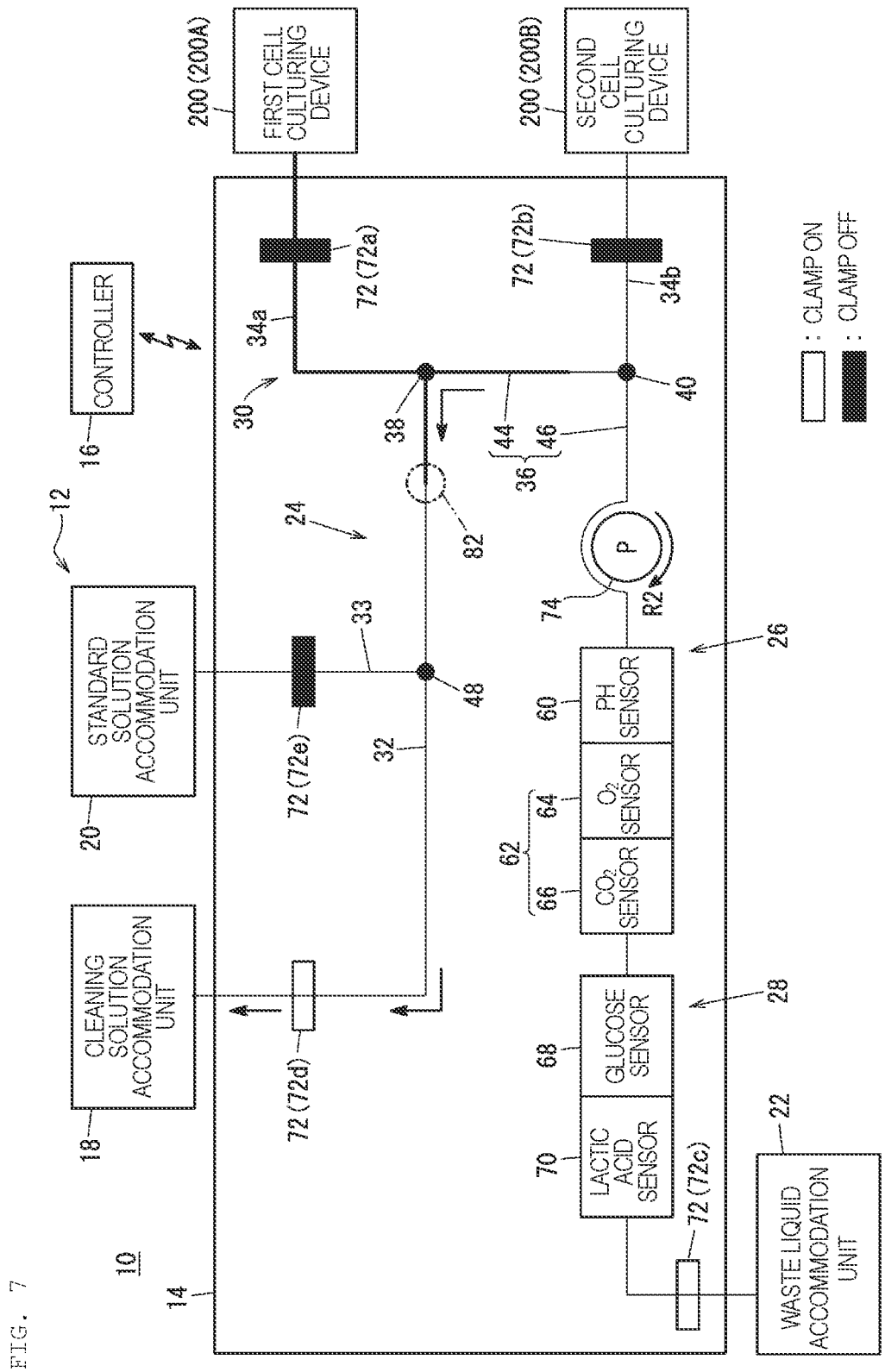
FIG. 7 is a schematic illustrating a third operation of the sampling method illustrated in FIGS. 3 and 4A-4C.

Subsequently, in the first returning step (step S7 in FIG. 4B), as shown in FIG. 7, the controller 16 may be configured to cause the pump 74 to perform the second rotation operation in a state in which the third clamp 72c and the fourth clamp 72d are turned on and the first clamp 72a, the second clamp 72b, and the fifth clamp 72e are turned off. Accordingly, the first sample in the sample flow path 36 may flow into the introduction path 32 by the action of the pump 74, and the cleaning solution in the introduction path 32 is pushed back into the cleaning solution accommodation unit 18. Accordingly, the cleaning solution remaining in a vicinity of the first connection portion 38 in the introduction path 32 may be removed (replaced with the first sample).

Specifically, the controller 16 may be configured to stop the second rotation operation of the pump 74, for example, before the first sample reaches the third connection portion 48 in the introduction path 32. In other words, the controller 16 may stop the second rotation operation of the pump 74 when a second time has elapsed since the pump 74 is caused to perform the second rotation operation. Here, the second time may be an elapsed time from a time when the pump 74 is caused to perform the second rotation operation until a time when the vicinity of the first connection portion 38 in the introduction path 32 is replaced with the sample. However, a sample detection sensor 82 (see FIG. 7) that detects the sample flowing through a portion between the third connection portion 48 and the first connection portion 38 in the introduction path 32 may be provided in the circuit control device 14, and the controller 16 may stop the second rotation operation of the pump 74 when the sample detection sensor 82 has detected the sample.

In the first returning step, a timing at which the second rotation operation of the pump 74 may be stopped can be appropriately changed. That is, the timing at which the second rotation operation of the pump 74 is stopped may be a timing at which the first sample has reached a section between the third connection portion 48 in the introduction path 32 and the cleaning solution accommodation unit 18.

Figure 8:
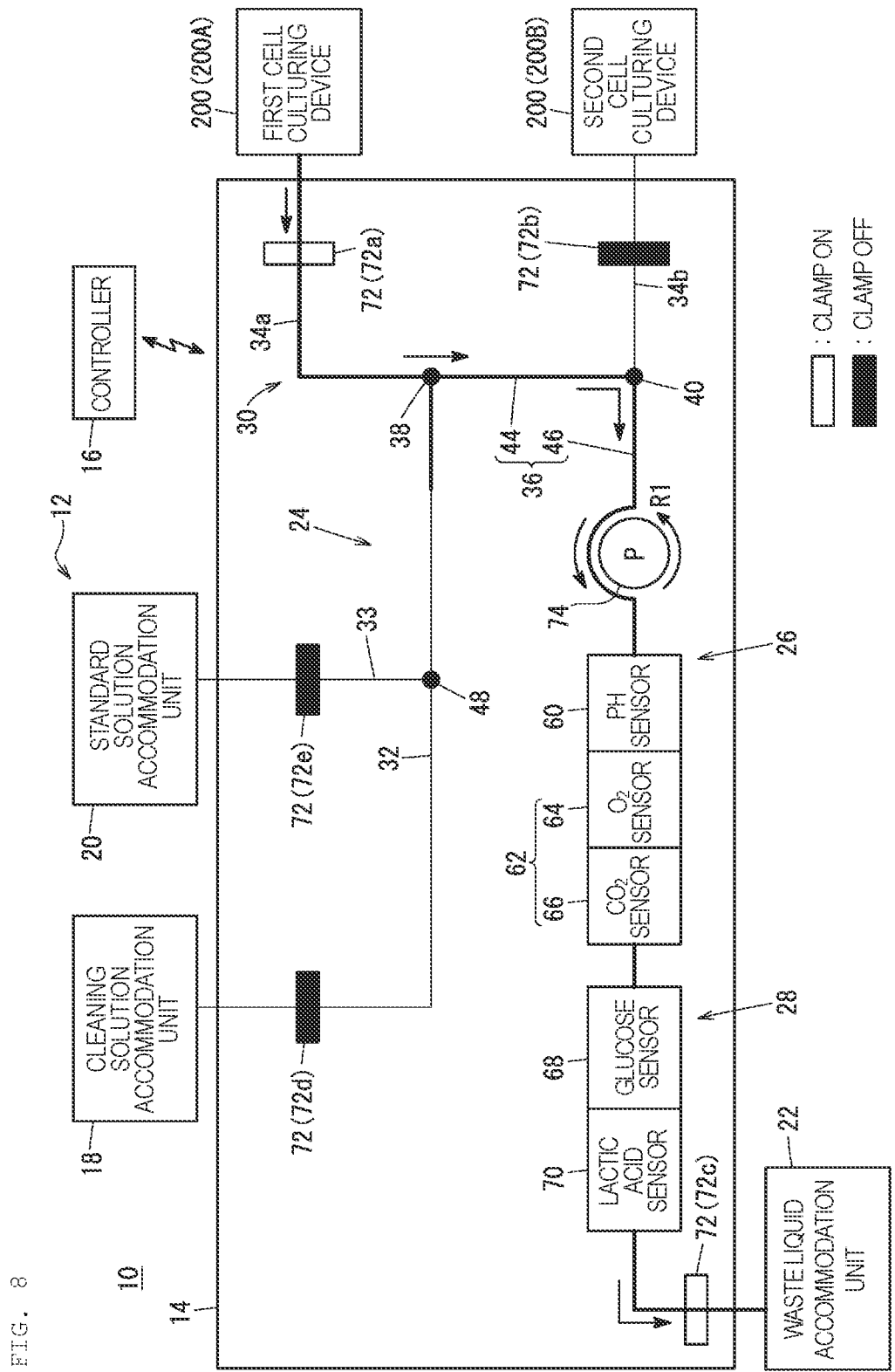
FIG. 8 is a schematic illustrating a fourth operation of the sampling method illustrated in FIGS. 3 and 4A-4C.

Then, in the first flowing step (step S8 in FIG. 4B), as shown in FIG. 8, the controller 16 may be configured to cause the pump 74 to perform the first rotation operation in a state in which the first clamp 72a and the third clamp 72c are turned on, and the second clamp 72b, the fourth clamp 72d, and the fifth clamp 72e are turned off. Accordingly, the first sample in the first cell culturing device 200A may be guided to the waste liquid accommodation unit 22 through the first sample introduction path 34a, the first connection portion 38, the intermediate flow path 44, the second connection portion 40, and the sensor flow path 46 by the action of the pump 74.

At this time, since the vicinity of the first connection portion 38 in the introduction path 32 is filled with the first sample (the cleaning solution is removed), the cleaning solution may be prevented from being mixed from the first connection portion 38 into the first sample flowing through the sampling flow path 30. That is, a change in the concentration of the first sample due to mixing of the cleaning solution may be prevented.

In the first flowing step, the first sensor 26 and/or the second sensor 28 may be in contact with the first sample. In the first sensor 26, a pH, an $O_2$ concentration, and/or a $CO_2$ concentration in the first sample may be measured. A measurement result obtained by the first sensor 26 may be transmitted to the controller 16. Further, in the second sensor 28, a glucose concentration and/or a lactic acid concentration in the first sample may be measured. A measurement result obtained by the second sensor 28 may be transmitted to the controller 16. The controller 16 may be configured to control a culture condition in the first cell culturing device 200A based on the measurement results obtained by the first sensor 26 and the second sensor 28.

Figure 4A:
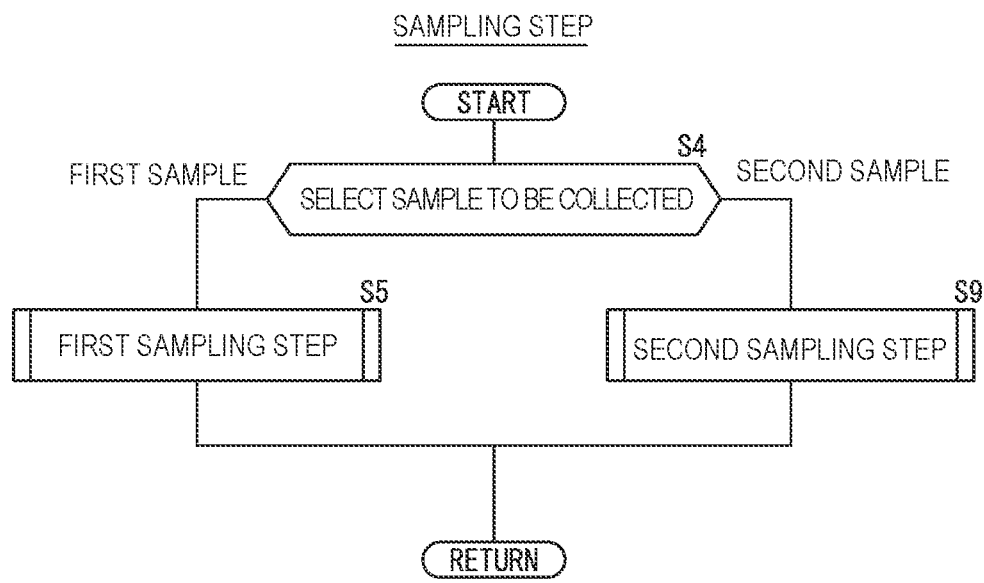
FIG. 4A is a flowchart further illustrating the sampling step as illustrated in FIG. 3.
Figure 4B:
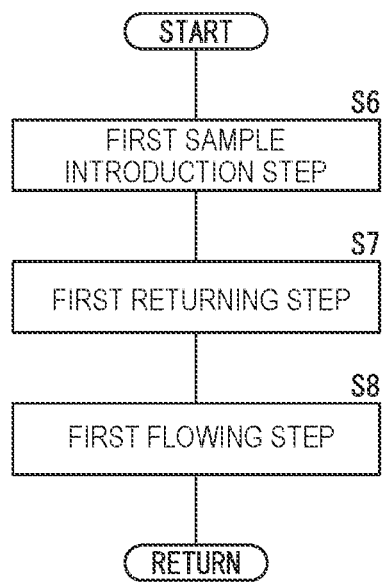
FIG. 4B is a flowchart further illustrating a first sampling step as illustrated in FIG. 4A.

When the controller 16 selects to collect the second sample, a second sampling step may be performed (step S9 in FIG. 4A). The second sampling step may include a second sample introduction step, a second returning step, and/or a second flowing step.

Figure 4C:
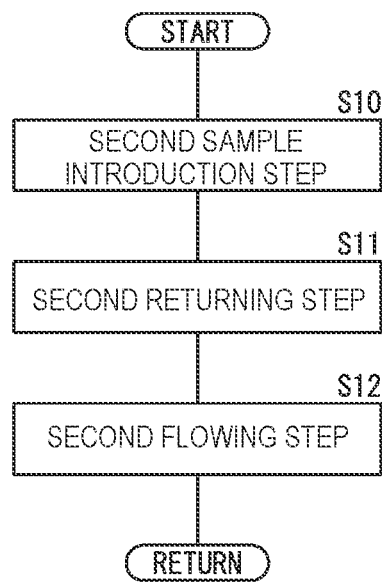
FIG. 4C is a flowchart further illustrating a second sampling step as illustrated in FIG. 4A.
Figure 9:
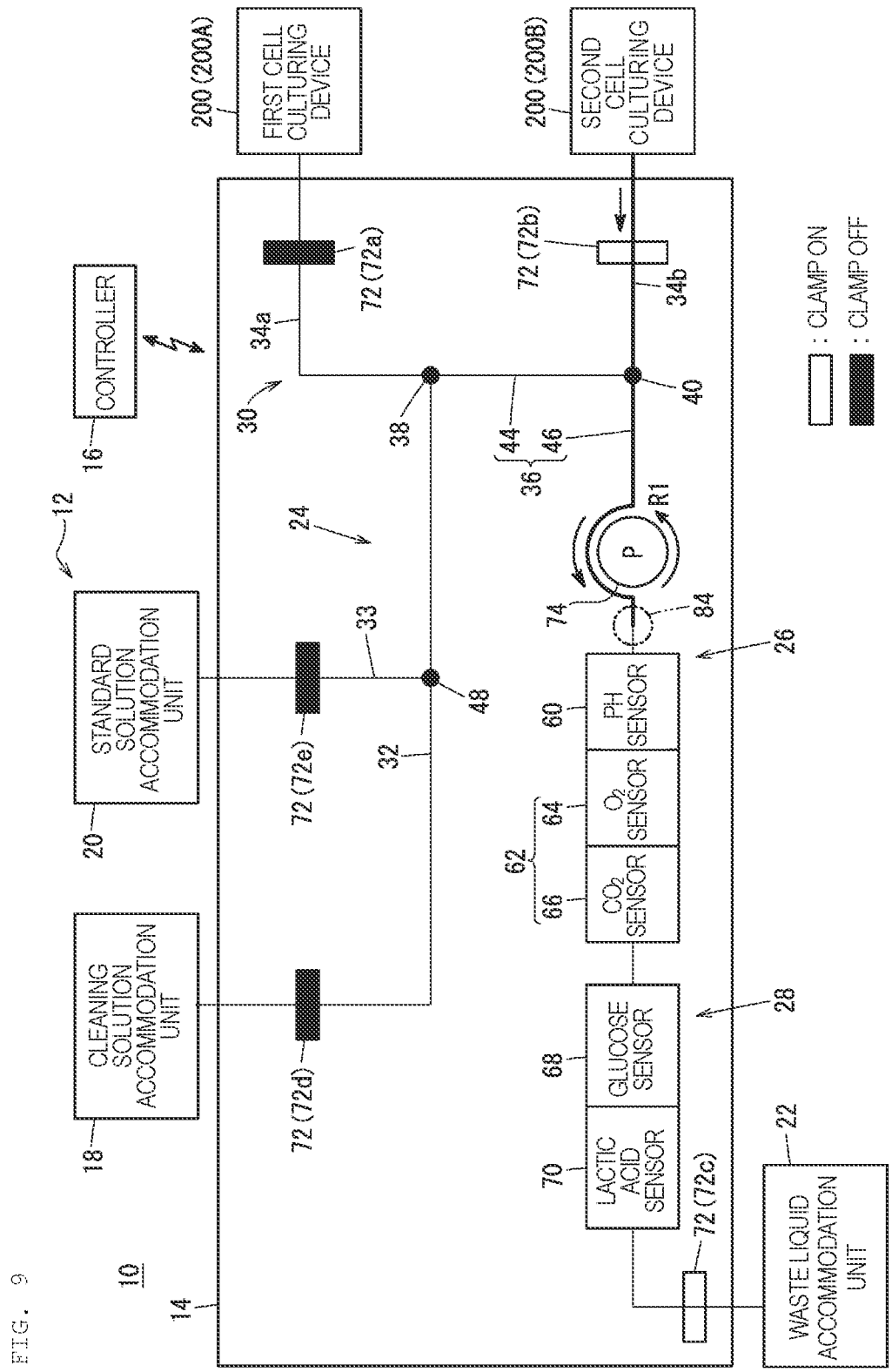
FIG. 9 is a schematic illustrating a fifth operation of the sampling method illustrated in FIGS. 3 and 4A-4C.

In the second sample introduction step (step S10 in FIG. 4C), as shown in FIG. 9, the controller 16 may cause the pump 74 to perform the first rotation operation in a state in which the second clamp 72b and the third clamp 72c are turned on, and the first clamp 72a, the fourth clamp 72d, and the fifth clamp 72e are turned off. Accordingly, the second sample in the second cell culturing device 200B may be guided from the second sample introduction path 34b to the sensor flow path 46 (sample flow path 36) through the second connection portion 40 by the action of the pump 74.

Specifically, the controller 16 may be configured to stop the first rotation operation, for example, when the second sample reaches the position in front of the first sensor 26 in the sensor flow path 46 (for example, reaches a position closer to the first sensor 26 than the center of the section between the second connection portion 40 and the first sensor 26 in the sensor flow path 46). In other words, the controller 16 may stop the first rotation operation of the pump 74 when a third time has elapsed since the pump 74 is caused to perform the first rotation operation. Here, the third time is an elapsed time from a time when the pump 74 is caused to perform the first rotation operation until a time when the second sample reaches the position in front of the first sensor 26 in the sensor flow path 46. However, a sample detection sensor 84 that detects the sample flowing through the portion between the second connection portion 40 and the first sensor 26 in the sensor flow path 46 may be provided in the circuit control device 14, and the controller 16 may stop the first rotation operation of the pump 74 when the sample detection sensor 84 has detected the sample.

In the second sample introduction step, a timing at which the first rotation operation of the pump 74 may be stopped can be appropriately changed. That is, the timing at which the first rotation operation of the pump 74 is stopped may be a timing at which the second sample has reached a section between the first sensor 26 and the second sensor 28 in the sensor flow path 46, a timing at which the second sample has reached the section between the second sensor 28 in the sensor flow path 46 and the waste liquid accommodation unit 22, or a timing after the second sample is accommodated in the waste liquid accommodation unit 22.

Figure 10:
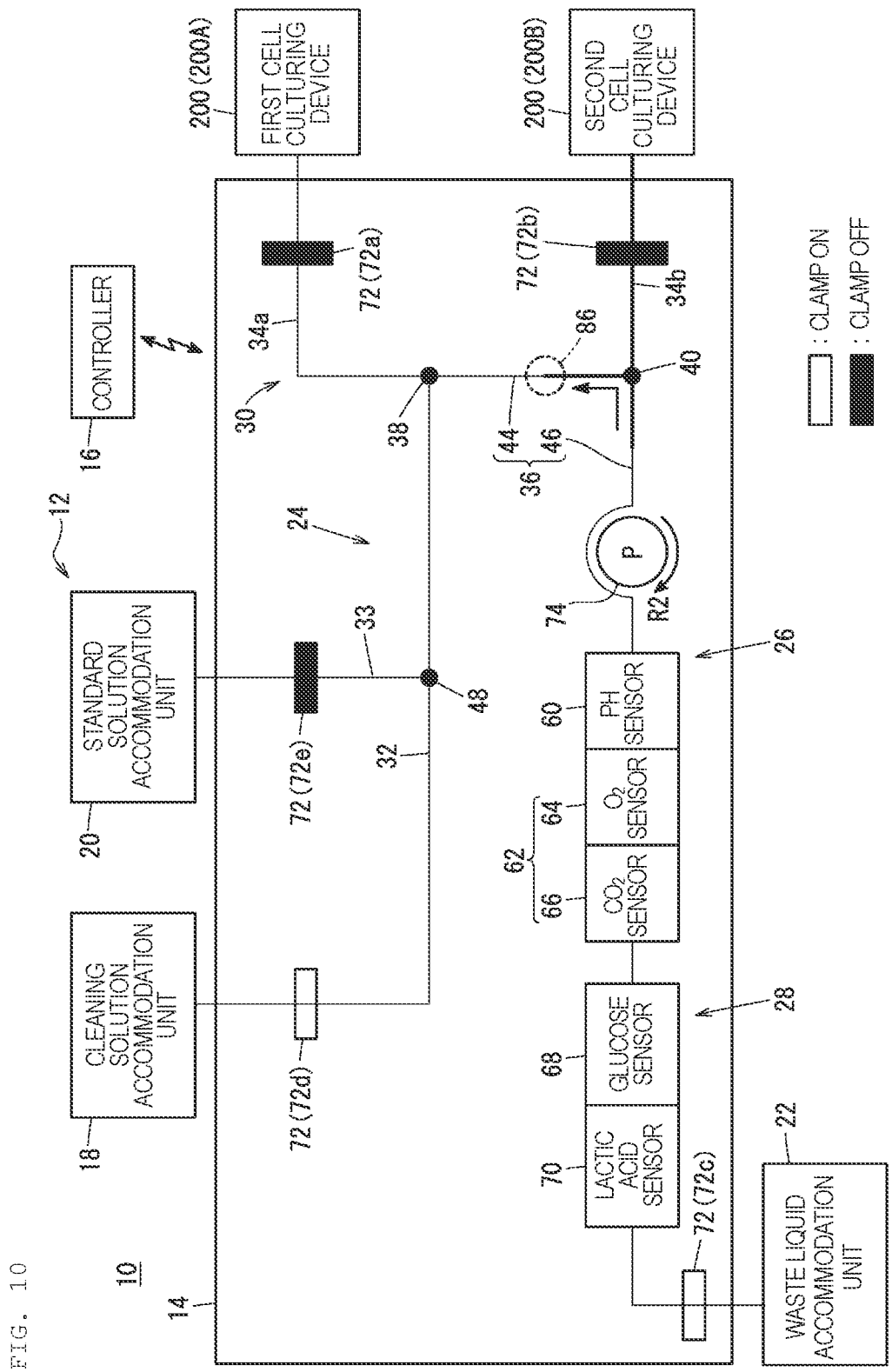
FIG. 10 is a schematic illustrating a sixth operation of the sampling method illustrated in FIGS. 3 and 4A-4C.

Subsequently, in the second returning step (step S11 in FIG. 4C), as shown in FIG. 10, the controller 16 may be configured to cause the pump 74 to perform the second rotation operation in the state in which the third clamp 72c and the fourth clamp 72d are turned on, and the first clamp 72a, the second clamp 72b, and the fifth clamp 72e are turned off. Accordingly, the second sample in the sensor flow path 46 flows into the intermediate flow path 44 by the action of the pump 74, and the cleaning solution remaining in the intermediate flow path 44 may be pushed back to the introduction path 32 through the first connection portion 38. Accordingly, the cleaning solution remaining in the vicinity of the second connection portion 40 in the intermediate flow path 44 may be removed (replaced with the second sample).

Specifically, the controller 16 may be configured to stop the second rotation operation of the pump 74, for example, before the second sample reaches the first connection portion 38. In other words, the controller 16 may stop the second rotation operation of the pump 74 when a fourth time has elapsed since the pump 74 is caused to perform the second rotation operation. Here, the fourth time may be an elapsed time from a time when the pump 74 is caused to perform the second rotation operation until a time when the vicinity of the second connection portion 40 in the intermediate flow path 44 is replaced with the second sample. However, a sample detection sensor 86 (see FIG. 10) that detects the sample flowing through the intermediate flow path 44 may be provided in the circuit control device 14, and the controller 16 may stop the second rotation operation of the pump 74 when the sample detection sensor 86 has detected the sample.

In the second returning step, a timing at which the second rotation operation of the pump 74 is stopped can be appropriately changed. That is, the timing at which the second rotation operation of the pump 74 is stopped may be a timing at which the second sample has reached the introduction path 32.

Figure 11:
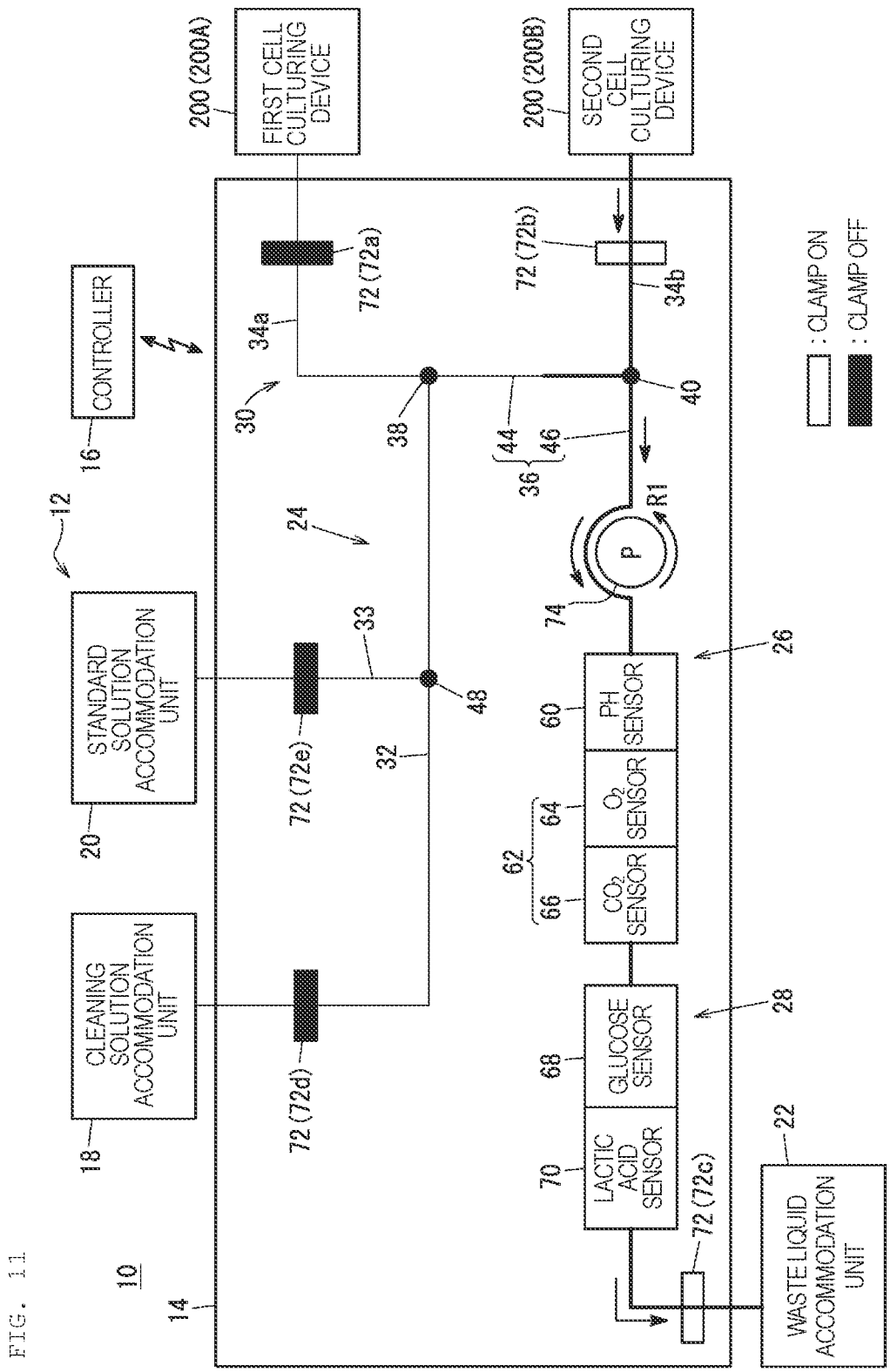
FIG. 11 is a schematic illustrating a seventh operation of the sampling method illustrated in FIGS. 3 and 4A-4C.

Then, in the second flowing step (step S12 in FIG. 4C), as shown in FIG. 11, the controller 16 may be configured to cause the pump 74 to perform the first rotation operation in a state in which the second clamp 72b and the third clamp 72c are turned on, and the first clamp 72a, the fourth clamp 72d, and the fifth clamp 72e are turned off. Accordingly, the second sample in the second cell culturing device 200B may be guided to the waste liquid accommodation unit 22 through the second sample introduction path 34b, the second connection portion 40, and the sensor flow path 46 by the action of the pump 74.

At this time, since the vicinity of the second connection portion 40 in the intermediate flow path 44 may be filled with the second sample (the cleaning solution is removed), the cleaning solution may be prevented from being mixed from the second connection portion 40 into the second sample flowing through the sampling flow path 30. That is, a change in the concentration of the second sample due to mixing of the cleaning solution may be prevented.

In the second flowing step, in the first sensor 26, a pH, an $O_2$ concentration, and/or a $CO_2$ concentration in the second sample may be measured. A measurement result obtained by the first sensor 26 may be transmitted to the controller 16. Further, in the second sensor 28, a glucose concentration and/or a lactic acid concentration in the second sample may be measured. A measurement result obtained by the second sensor 28 may be transmitted to the controller 16. The controller 16 may be configured to control a culture condition in the second cell culturing device 200B based on the measurement results obtained by the first sensor 26 and the second sensor 28.

When the sampling step is completed, in FIG. 3, the controller 16 may be configured to determine whether cell culturing in the first cell culturing device 200A and the second cell culturing device 200B is completed (step S13). When the controller 16 determines that the cell culturing is not completed (step S13: NO), the cleaning step (step S14) may be performed. In the cleaning step, as shown in FIG. 5, the controller 16 operates the plurality of clamps 72 and the pump 74 as in the priming step. Accordingly, the cleaning solution in the cleaning solution accommodation unit 18 flows through the first sensor 26 and the second sensor 28 and may be guided to the waste liquid accommodation unit 22.

Accordingly, in the first sensor 26, the sample adhering to the pH sensor 60, the $O_2$ sensor 64, and/or the $CO_2$ sensor 66 may be removed by the cleaning solution. In the second sensor 28, the sample adhering to the glucose sensor 68 and/or the lactic acid sensor 70 may be removed by the cleaning solution.

Figure 12:
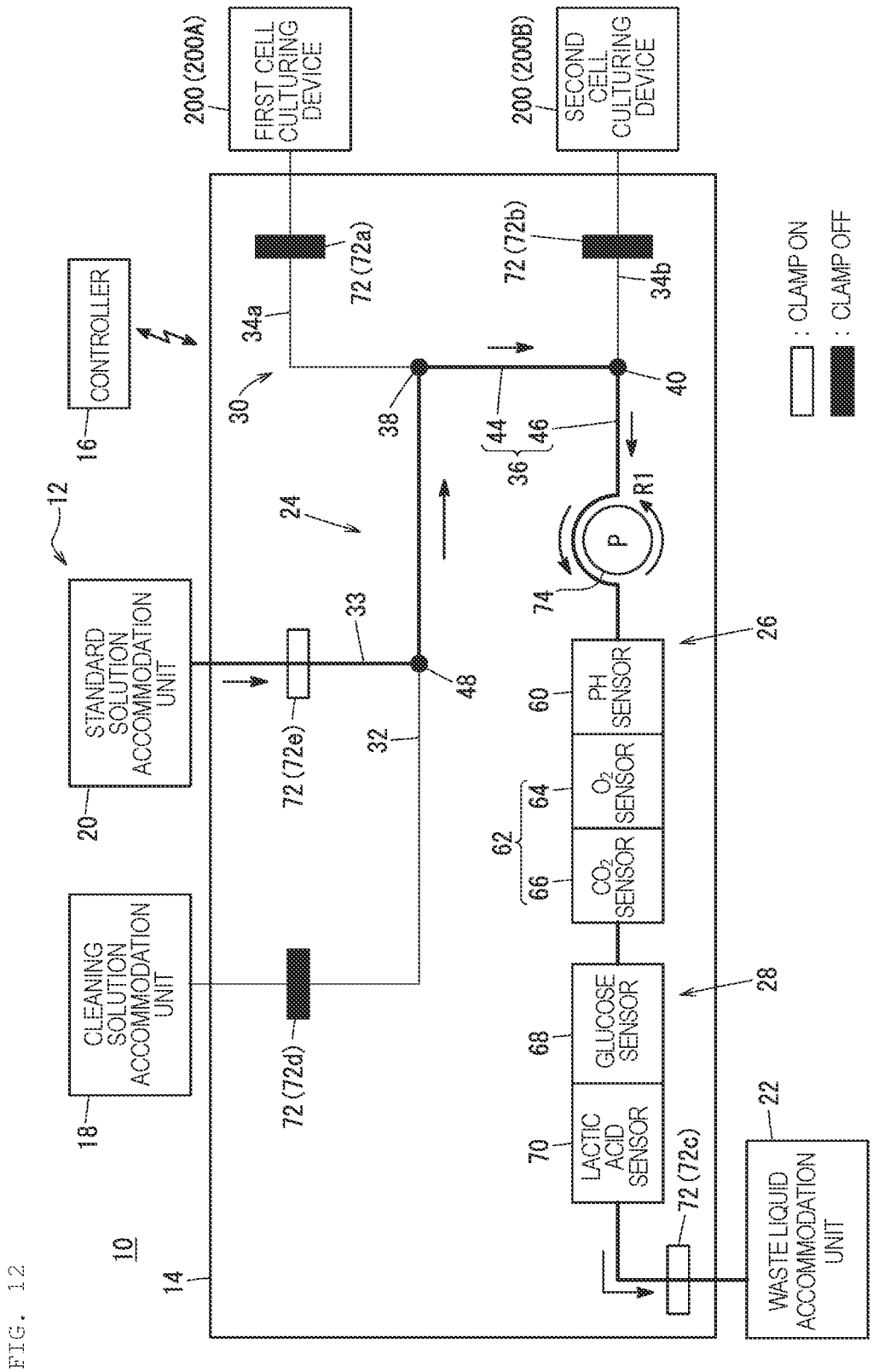
FIG. 12 is a schematic illustrating an eighth operation of the sampling method. illustrated in FIGS. 3 and 4A-4C

Thereafter, the calibration step (step S15) may be performed as necessary. In the calibration step, as shown in FIG. 12, the controller 16 may be configured to cause the pump 74 to perform the first rotation operation in a state in which the third clamp 72c and the fifth clamp 72e are turned on, and the first clamp 72a, the second clamp 72b, and the fourth clamp 72d are turned off. Accordingly, the standard solution in the standard solution accommodation unit 20 may be guided to the waste liquid accommodation unit 22 through the standard solution introduction path 33, the introduction path 32, the first connection portion 38, the intermediate flow path 44, the second connection portion 40, and the sensor flow path 46 by the action of the pump 74.

At this time, the first sensor 26 may be configured to measure a pH, an $O_2$ concentration, and/or a $CO_2$ concentration in the standard solution. A measurement result obtained by the first sensor 26 may be transmitted to the controller 16. The controller 16 may be configured to perform calibration on the pH sensor 60, the $O_2$ sensor 64, and/or the $CO_2$ sensor 66 based on the measurement result obtained by the first sensor 26. In addition, the second sensor 28 may be configured to measure a glucose concentration and/or a lactic acid concentration in the standard solution. A measurement result obtained by the second sensor 28 may be transmitted to the controller 16. The controller 16 may be configured to perform calibration on the glucose sensor 68 and/or the lactic acid sensor 70 based on the measurement result obtained by the second sensor 28. When the calibration step is completed, the steps after step S3 may be sequentially performed. In the present embodiment, the sampling step may be performed twice or more.

When the controller 16 determines that the cell culturing is completed (step S13 in FIG. 3: YES), a flow of a series of operations may be completed.

In at least one example embodiment, the sampling method may include the sampling step and the cleaning step. The sampling step may include causing the first sample to flow through the sampling flow path 30 from the first cell culturing device 200A and measuring the concentration of a predetermined component in the sample by the second sensor 28. The cleaning step may include, after the sampling step, causing the cleaning solution to flow from the introduction path 32 to the second sensor 28 through the sampling flow path 30. A treatment including the sampling step and the cleaning step may be performed a plurality of times.

In at least one example embodiment, the sampling step may also include the first sample introduction step that includes introducing the first sample from the first cell culturing device 200A downstream of the first connection portion 38; the first returning step that includes, for example, after the first sample introduction step, causing the first sample in the sampling flow path 30 to flow into the introduction path 32 from the first connection portion 38; and/or the flowing step that includes, for example, after the first returning step, causing the first sample to flow through the sampling flow path 30 from the first cell culturing device 200A and bringing the first sample into contact with the second sensor 28.

According to such a method, since the cleaning step may be performed after the sampling step, the sample adhering to the second sensor 28 in the sampling step can be further removed by the cleaning solution in the cleaning step. In addition, in the first sample introduction step, the first sample may be introduced to the sampling flow path 30 from the first cell culturing device 200A downstream of the first connection portion 38, and then the first sample may be caused to flow into the introduction path 32 in the first returning step. Accordingly, the vicinity of the first connection portion 38 in the introduction path 32 can be filled with the first sample (i.e., the cleaning solution can be removed from the vicinity of the first connection portion 38 in the introduction path 32). Therefore, in the first flowing step, when the first sample is caused to flow through the sampling flow path 30 from the first cell culturing device 200A and is brought into contact with the second sensor 28, the cleaning solution in the introduction path 32 can be prevented from being mixed from the first connection portion 38 into the first sample flowing through the sampling flow path 30.

The cleaning solution accommodation unit 18 in which the cleaning solution may be accommodated may be connected to the introduction path 32. In the first returning step, an inflow of the first sample into the introduction path 32 may be stopped before the first sample reaches the cleaning solution accommodation unit 18.

According to such a method, it may be possible to prevent the first sample from being mixed with the cleaning solution in the cleaning solution accommodation unit 18.

The sampling flow path 30 may include the sample flow path 36 provided with the second sensor 28, and the first sample introduction path 34*a* configured to guide the first sample in the first cell culturing device 200A to the first connection portion 38. The sampling system 10 may include the first clamp 72*a* (first on-off unit) that may be configured to turn on or off the first sample introduction path 34*a*, the fourth clamp 72*d* (second on-off unit) that may be configured to turn on or off the introduction path 32, and the pump 74 provided in the sample flow path 36.

In the cleaning step, the cleaning solution may be caused to flow through the second sensor 28 by driving the pump 74 in a state in which the first clamp 72*a* is turned off and the fourth clamp 72*d* is turned on. In the first sample introduction step, the first sample may be introduced to the sample flow path 36 by driving the pump 74 in a state in which the first clamp 72*a* is turned on and the fourth clamp 72*d* is turned off. In the first returning step, the first sample in the sample flow path 36 may be caused to flow into the introduction path 32 from the first connection portion 38 by driving the pump 74 in the state in which the first clamp 72*a* is turned off and the fourth clamp 72*d* is turned on. In the first flowing step, the first sample may be brought into contact with the second sensor 28 by driving the pump 74 in the state in which the first clamp 72*a* may be turned on and the fourth clamp 72*d* may be turned off.

According to such a method, the cleaning step, the first sample introduction step, the first returning step, and/or the first flowing step may be easily performed by driving the first clamp 72*a*, the fourth clamp 72*d*, and the pump 74.

In the first sample introduction step and the first returning step, the driving of the pump 74 may be stopped based on an elapsed time (first time and second time) from a start of the driving of the pump 74.

According to such a method, it may be possible to easily control the driving of the pump 74.

The sampling system 10 may include the sample detection sensor 80 configured to detect the sample flowing through the sample flow path 36. In the first sample introduction step, the driving of the pump 74 may be stopped when the sample detection sensor 80 has detected the first sample.

According to such a method, an appropriate amount of the first sample may be introduced into the sample flow path 36 in the first sample introduction step. In other words, it may be possible to prevent an excessive amount of the first sample from being introduced into the sample flow path 36 in the first sample introduction step.

The sampling system 10 may include the sample detection sensor 82 for detecting the first sample flowing through the introduction path 32. In the returning step, the driving of the pump 74 may be stopped when the sample detection sensor 82 has detected the first sample.

According to such a method, an appropriate amount of the first sample may be caused to flow into the introduction path 32 in the first returning step. In other words, it may be possible to prevent an excessive amount of the first sample from being introduced into the introduction path 32 in the first returning step.

The gas concentration sensor 62 which may be configured to measure a gas concentration in the first sample in a manner of being in contact with the first sample may be provided in the sampling flow path 30 downstream of the first connection portion 38. In the first flowing step, the first sample may be caused to flow through the sampling flow path 30 and may be brought into contact with the gas concentration sensor 62.

According to such a method, the gas concentration in the first sample may be measured by the gas concentration sensor 62. Since the cleaning solution may be prevented from being mixed into the first sample by the first sample introduction step and the first returning step, the gas concentration in the first sample may be accurately measured by the gas concentration sensor 62.

The sampling system 10 may collect a sample in one cell culturing device 200 and measure a concentration of a predetermined component thereof. In such instances, the sampling system may not include the second sample introduction path 34b. The sampling system may individually collect samples in three or more cell culturing devices 200 and measure concentrations of a predetermined component. In other words, the number of cell culturing devices 200 connected to the sampling flow path 30 may be three or more. In this case, the number of sample introduction paths may correspond to the number of cell culturing devices 200.

The invention is not limited to the above embodiment, and various modifications can be made without departing from the gist of the invention. The above embodiment describes a cell culturing system in which the sampling system 10 and the cell culturing device 200 are separately formed, but the cell culturing system may be one in which the sampling system 10 and the cell culturing device 200 are integrated (unified) with each other.

In at least one example embodiment, a sampling method is provided that uses a sampling system (10) that has a sampling flow path (30) configured to collect or receive a sample of a liquid from a cell culturing device (20A). The sampling system may include a biosensor (28) provided in the sampling flow path to be in contact with the sample, and an introduction path (32) configured to introduce a cleaning solution to the sampling flow path upstream of the biosensor. The sampling method may include a sampling step (step S3) that includes causing the sample to flow through the sampling flow path from the cell culturing device and measuring a concentration of a predetermined component in the sample by the biosensor, and a cleaning step (step S14) that includes causing the cleaning solution to flow from the introduction path into the biosensor through the sampling flow path after the sampling step. The sampling step may be performed twice or more. The sampling step at second and subsequent times may be performed after the cleaning step. The sampling step may also include a sample introduction step (step S6) of introducing the sample from the cell culturing device downstream of a connection portion (38) that joins the introduction path and the sampling flow path; a returning step (step S7) of causing the sample in the sampling flow path to flow into the introduction path from the connection portion after the sample introduction step; and/or a flowing step (step S8) of causing the sample to flow through the sampling flow path from the cell culturing device and bringing the sample into contact with the biosensor after the returning step.

In at least one example embodiment, the introduction path may include a cleaning solution accommodation unit (18) configured to accommodate the cleaning solution. In the returning step, the cleaning solution may be pushed back into the cleaning solution accommodation unit. In the returning step, the sample flow may cease before the sample reaches or enters the cleaning solution accommodation unit.

In at least one example embodiment, the sampling flow path may include a sample flow path (36) provided with the biosensor, and a sample introduction path (34a) for guiding the sample in the cell culturing device to the connection portion. The sampling system may include a first on-off unit (72a) configured to turn on or off the sample introduction path, a second on-off unit (72d) configured to turn on or off the introduction path, and a pump (74) provided in the sample flow path. In the cleaning step, the cleaning solution may be caused to flow through the biosensor by driving the pump in a state in which the first on-off unit is turned off and the second on-off unit is turned on. In the sample introduction step, the sample may be introduced into the sample flow path by driving the pump in a state in which the first on-off unit is turned on and the second on-off unit is turned off. In the returning step, the sample in the sample flow path may be caused to flow into the introduction path from the connection portion by driving the pump in the state in which the first on-off unit is turned off and the second on-off unit is turned on. In the flowing step, the sample may be brought into contact with the biosensor by driving the pump in the state in which the first on-off unit is turned on and the second on-off unit is turned off.

In at least one example embodiment, in the sample introduction step and the returning step, driving of the pump may be stopped based on an elapsed time from a start of the driving of the pump.

In the sampling method, the sampling system may include a sample detection sensor (80) for detecting the sample flowing through the sample flow path, and in the sample introduction step, driving of the pump may be stopped when the sample is detected by the sample detection sensor.

In the sampling method, the sampling system may include a sample detection sensor (82) for detecting the sample flowing through the introduction path, and in the returning step, driving of the pump may be stopped when the sample is detected by the sample detection sensor.

In the sampling method, a gas concentration sensor (62) may be configured to measure a gas concentration in the sample in a manner of being in contact with the sample may be provided on a more downstream side than the connection portion in the sampling flow path, and in the flowing step, the sample may be caused to flow through the sampling flow path and be brought into contact with the gas concentration sensor.

The invention claimed is:

1. A sampling method comprising:
a sampling step including
causing a sample to flow to and through a sampling flow path of a sampling system from a cell culturing device, the sampling system including a biosensor disposed in the sampling flow path and in fluid contact with the sample, and
measuring a concentration of a predetermined component in the sample by the biosensor;
a cleaning step including
causing a cleaning solution to flow from an introduction path of the sampling system into the sampling flow path upstream of the biosensor, the introduction path joining the sampling flow path at a connection portion; and
a returning step including
causing the sample in the sampling flow path to flow into the introduction path upstream of the connection portion
wherein the sampling step is performed twice or more, and the sampling step at second and subsequent times is performed after the cleaning step.

2. The sampling method of claim 1, wherein
the introduction path includes a cleaning solution accommodation unit configured to accommodate the cleaning solution,
during the returning step, the cleaning solution is pushed back into the cleaning solution accommodation unit.

3. The sampling method of claim 2, wherein the sample flow is stopped before the sample reaches or enters the cleaning solution accommodation unit.

4. The sampling method of claim 2, wherein the sampling flow path includes a sample introduction path for guiding the sample from the cell culturing device to the connection portion.

5. The sampling method of claim 4, wherein the sampling system further includes
a first on-off unit configured to turn on or off the sample introduction path,
a second on-off unit configured to turn on or off the introduction path, and
a pump provided in the sample flow path.

6. The sampling method of claim 5, wherein in the returning step, the method includes:
turning the first on-off unit to an off state,
turning the second on-off unit to an on state, and
driving the sample pass the connection portion and into the introduction path using the pump.

7. The sampling method of claim 6, wherein the method further includes: stopping the pump after a preselected time elapses following the start of the driving of the pump.

8. The sampling method of claim 6, wherein the sampling system further includes a sample detection sensor for detecting the sample flowing through the introduction path, and the method further includes stopping the pump when the sample is detected by the sample detection sensor.

9. The sampling method of claim 5, wherein in the cleaning step, the method includes:
turning the first on-off unit to an off state,
turning the second on-off unit to an on state, and
driving the cleaning solution into and through the sampling flow path to make contact with the biosensor using the pump.

10. The sampling method of claim 5, wherein the causing of the sample to flow to and through the sampling flow path from the cell culturing device includes:
a sampling introduction step where the sample is caused to move from the cell culturing device through the sample introduction path to the connection portion; and
a flowing step where the sample is caused to move from the connection portion and to the biosensor.

11. The sampling method of claim 10, wherein in the sample introduction step, the method includes:
turning the first on-off unit to an on state;
turning the second on-off unit to an off state, and
driving the sample to the connection portion using the pump.

12. The sampling method of claim 11, wherein the method further includes:
stopping the pump after a preselected time elapses following the start of the driving of the pump.

13. The sampling method of claim 11, wherein the sampling system further includes a sample detection sensor configured to detect the sample flowing through the sample flow path, and the method further includes stopping the pump when the sample is detected by the sample detection sensor.

14. The sampling method of claim 10, wherein in the flowing step, the method includes:
turning the first on-off unit to an on state,
turning the second on-off unit to an off state, and
driving the sample through the sampling flow path and into contact with the biosensor using the pump.

15. The sampling method of claim 1, wherein the sampling system further includes a gas concentration sensor disposed downstream of the connection portion and configured to measure a gas concentration in the sample, and in the flowing step, the sample is brought into contact with the gas concentration sensor.

16. A sampling method using a sampling system, the method comprising:
a sampling introduction step including
causing a sample to flow from a cell culturing device to a connection point of the sampling system;
a cleaning step including
causing a cleaning solution to flow along an introduction path of the sampling system and into a sampling flow path of the sampling system, the sampling flow path including a biosensor, and the introduction path joining the sampling flow path at the connection portion and upstream of the biosensor;
a flowing step including
causing the sample to flow along from the connection portion to the biosensor; and
a returning step including
causing the sample in the sampling flow path to flow into the introduction path upstream of the connection portion,
wherein the introduction path includes a cleaning solution accommodation unit configured to accommodate the cleaning solution, and during the returning step, the cleaning solution is pushed back into the cleaning solution accommodation unit and sample flow is stopped before the sample reaches or enters the cleaning solution accommodation unit.

17. The sampling method of claim 16, wherein in the sample introduction step, the method includes:
turning a first clamp to an on state;
turning a second clamp to an off state, and
driving a pump to move the sample to the connection portion.

18. The sampling method of claim 16, wherein in the cleaning step, the method includes:
turning a first clamp to an off state,
turning a second clamp to an on state, and
driving a pump to move the cleaning solution into and through the sampling flow path to the biosensor.

19. The sampling method of claim 16, wherein in the flowing step, the method includes:
turning a first clamp to an on state,
turning a second clamp to an off state, and
driving a pump to move the sample through the sampling flow path and into contact with the biosensor.

20. The sampling method of claim 16, wherein in the returning step, the method includes:
turning a first clamp to an off state,
turning a second clamp to an on state, and
driving a pump to move the sample pass the connection portion and into the introduction path.

* * * * *